Oct. 19, 1943.   L. G. LEVOY, JR   2,332,325
ELECTRIC CONTROL CIRCUIT
Filed March 6, 1942
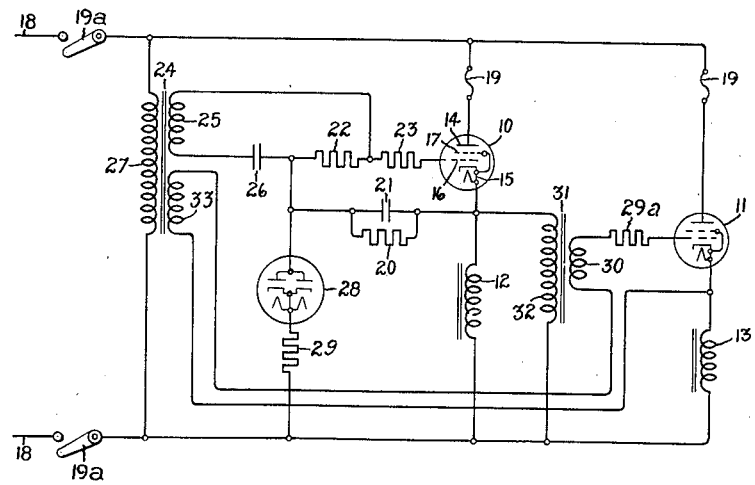
Inventor:
Louis G. Levoy Jr.,
by Harry E. Dunham
His Attorney.

Patented Oct. 19, 1943

2,332,325

UNITED STATES PATENT OFFICE 2,332,325

ELECTRIC CONTROL CIRCUIT

Louis G. Levoy, Jr., Schenectady, N. Y., assignor to General Electric Company, a corporation of New York Application March 6, 1942, Serial No. 433,557

4 Claims. (Cl. 250—27)

My invention relates to electric control circuits and more particularly to electric valve circuits for controlling the energization of a plurality of load circuits.

In many applications where the commercially available alternating current is of one frequency it is desirable to have a periodic voltage of lower frequency and in many cases the lower frequency voltage may be in the form of impulses of substantially the same duration as a half cycle of the commercial frequency. In Patent 2,132,264, King, dated October 4, 1938, and assigned to the same assignee as the present invention there is described and claimed a circuit for energizing a load circuit with a voltage impulse during one half cycle of the commercial frequency out of a predetermined number of half cycles. In the particular embodiment illustrated in the above mentioned patent the load is energized with a voltage impulse every fourth half cycle of the supply frequency. In the arrangement illustrated in the above mentioned patent the load circuit is the operating coil of an electromagnetic shaker for a vibrating screen or similar device. In such applications it is often desirable to subject the screen to a complex motion or snaking movement and this may be done to advantage by applying phase displaced periodic forces to the screen at different places. While not limited thereto the present invention is particularly well suited for such an application and in accordance with its teachings provides a simple, inexpensive and reliable circuit for producing time displaced periodically varying voltages.

An object of my invention is to provide a new and improved electric control circuit.

It is another object of my invention to provide a new and improved electric valve circuit for supplying a pair of load circuits with time displaced periodically varying voltages.

It is still another object of my invention to provide a new and improved electric valve circuit including means for preventing the simultaneous operation of a pair of parallel electric valves.

My invention will be better understood by reference to the following description taken in connection with the accompanying drawing and its scope will be pointed out in the appended claims. In the drawing the single figure is a schematic representation of one embodiment of my invention.

In accordance with the illustrated embodiment of my invention, a pair of electric valves are each connected in series with a different load circuit. The series connected valves and load circuits are connected in parallel and energized from an alternating current source with both of the valves poled the same way with respect to the alternating current circuit. The control member of one of the valves is energized with a voltage somewhat leading with respect to the anode-cathode voltage thereof so as to insure that the valve will conduct early in the anode-cathode voltage cycle. The voltage appearing across the load circuit as a result of the conduction is rectified and utilized as a hold-off voltage in the control member circuit of the electric valve. The hold-off voltage appears across a parallel connected resistor and capacitor which diminishes with time at a rate which will render the valve conductive again the desired number of cycles later. The second valve has the control member thereof energized by a voltage tending to render it conductive. This voltage is opposed by a voltage responsive to the conduction of the first valve so that the second valve is rendered nonconductive upon initiation of conduction of the first valve.

Referring now to the drawing, a pair of electric valves 10 and 11 are connected, respectively, in series with electrical loads 12 and 13 which are illustrated as inductive devices and may, for example, be the operating coils of an electro-magnetic shaking device. Each of the electric valves is preferably of the type utilizing an ionizable medium such as a gas or vapor, and comprising within an envelope an anode 14, a cathode 15, a control member or grid 16, and a shield grid 17. As illustrated in the drawing, each of the electric valves has the anode thereof connected with one side of an alternating current supply circuit 18 through protective fuses 19. The cathodes 15 are connected with one terminal of the load circuits 12 and 13, respectively, while the other terminals of the loads are connected with the other side of the alternating current supply circuit. Suitable manual switches 19a provide means for connecting the supply circuit 18 with the control circuit.

The cathode-to-control member circuit of electric valve 10 includes a parallel connected resistor 20 and capacitor 21 in series with resistors 22 and 23. Resistor 23 is a current limiting resistor and resistor 22 is utilized to impress on the control member an alternating current component of voltage which is leading with respect to the anode-cathode voltage of the tube 10 and is obtained from the supply circuit 18 by means of a transformer 24 having a secondary winding 25 and a series capacitor 26 connected to energize the resistor 22. As illustrated, the primary winding 27 of the transformer 24 is energized from the alternating current supply circuit 18. The leading component of alternating current voltage impressed across the resistor 22 tends to render electric valve 10 conductive at the beginning of the voltage cycle of the alternating current supply circuit 18. The parallel circuit including condenser 21 and resistor 20 provides means for rendering the valve 10 nonconductive for a predetermined number of half cycles after a period of conduction. The condenser 21 is charged in accordance with the voltage across the load 12 through a unilaterally conducting device 28 which, as illustrated, comprises a double anode electric valve. It will be apparent to those skilled in the art that any other suitable unilaterally conducting device, such as a contact rectifier, may be employed if desired. A current limiting impedance, such as resistor 29, is employed in series with the valve 28 and the parallel circuit including resistor 20 and capacitor 21. The control member-to-cathode circuit of electric valve 11 is energized through a current limiting resistor 29a by a secondary winding 30 of a transformer 31 having a primary winding 32 thereof connected across the load circuit 12 and also from the secondary winding 33 of the transformer 27. The voltage of the winding 33 is in a direction tending to render electric valve 11 conductive. It will be noted, however, that the voltage on the control member of valve 10 derived from transformer winding 25 and condenser 26 is considerably more leading than the voltage of winding 33 and as a result insures that electric valve 10 starts to conduct first. As soon as electric valve 10 conducts a voltage appears across the winding 30 which has a polarity and magnitude which renders valve 11 nonconducting. In this way valve 11 is maintained nonconducting in response to conduction of valve 10.

While no circuit for energizing the heater elements of the electric valves 10, 11 and 28 has been shown, it will be understood that they are heated from a suitable source, such as the source 18 before closing switches 19 which impress the voltage on the anode-cathode circuits of valves 10 and 11. Assuming that the electric valves have been brought to operating temperature and the switches 19 closed, the operation of the circuit is as follows. Electric valve 10 is rendered conductive by the alternating current component of voltage appearing across the resistor 22. Upon conduction of valve 10 the load 12 is energized and the voltage across this load is effective to charge the capacitor 21 and render the control member of the valve 10 negative. The voltage across the load circuit 12 also impresses a component of voltage on the winding 30 which maintains the electric valve 11 nonconductive by overcoming the voltage of winding 33 which tends to render the valve 11 conductive. The resistor 20 and capacitor 21 are so chosen that the decrease of the voltage of capacitor 21 occurs at such a rate that the valve 10 is rendered conductive by the alternating current component of voltage appearing across resistor 22 the desired number of half cycles later. After electric valve 10 has conducted for one half cycle it is held off for succeeding half cycles by the charge on the capacitor 21 and electric valve 11 conducts for the positive half cycles of voltage of the source 18 during which valve 10 is maintained nonconductive. While in the particular arrangement illustrated, the constants of the circuit were selected so that valve 10 conducts on alternate positive half cycles and is held off on the intermediate positive half cycles by the voltage of capacitor 21, and electric valve 11 is maintained nonconductive during the half cycles of conduction of valve 10 by means of the voltage derived from the load circuit 12, it will be apparent that valve 10 may be made to conduct for two successive positive half cycles, for example, and then remain nonconductive for any desired number of positive half cycles while valve 11 is conducting. The particular sequence of conduction of valves 10 and 11 is determined by the constants of the charging and discharging circuits of condenser 21. Thus it is seen that the present invention provides a simple circuit in which two electric valves connected in parallel and poled the same way with respect to an alternating current circuit are made to conduct for different positive half cycles and to produce time displaced periodic voltages across a pair of load circuits. As mentioned earlier in the specification, such a circuit is particularly well adapted for energizing the operating coils of shaker solenoids such as are used on electromagnetically operated screens for example, when it is desired to subject the screen to a complex movement by subjecting it to out of phase intermittent forces.

While I have described what I at present consider the preferred embodiment of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. A control circuit for supplying time displaced periodically varying voltages to a pair of load circuits comprising a source of alternating current, a pair of electric valves, said valves, load circuits and source being interconnected so that said load circuits are energized in parallel from said source and the energization of each load is controlled by a different one of said valves, each of said valves including a control member, means for supplying a voltage to the control member of one of said valves to render said valve conducting during a half cycle of voltage of said source, means responsive to conduction of said valve for modifying the voltage impressed on said control member to maintain said one valve nonconductive for a predetermined number of succeeding half cycles of voltage of said source, means for energizing the control member of the other of said valves tending to render said other valve conducting every positive half cycle of voltage of said source, and means responsive to conduction of said one of said valves for preventing simultaneous conduction of the other of said valves.

2. A control circuit for supplying time displaced periodically varying voltages to a pair of load circuits comprising a source of alternating current, a pair of electric valves, said valves, load circuits and source being interconnected so that said load circuits are energized in parallel from said source and the energization of each load is controlled by a different one of said valves, each of said valves being poled the same way with respect to said alternating current circuit and including a control member, means for supplying a voltage to the control member of one of said valves to render said valve conducting during a half cycle of voltage of said source, means responsive to conduction of said valve for modifying the voltage impressed on said control member to maintain said one valve nonconductive for a predetermined number of succeeding half cycles of voltage of said source, means for energizing the control member of the other of said valves tending to render said other valve conducting every positive half cycle of voltage of said source, and means responsive to conduction of said one of said valves for preventing simultaneous conduction of the other of said valves.

3. A control circuit for supplying time displaced periodically varying voltages to a pair of load circuits comprising a source of alternating current, a pair of electric valves, said valves, load circuits and source being interconnected so that said load circuits are energized in parallel from said source and the energization of each load is controlled by a different one of said valves, each of said valves being poled the same way with respect to said alternating current circuit and including a control member, means for supplying a voltage to the control members of each of said valves tending to render said valves conductive during a half cycle of voltage of said source, means for modifying the voltage impressed on the control member of one of said valves to render said one valve conductive at an earlier point in the anode-cathode voltage thereof, a capacitance in the control member circuit of said one valve, means for charging said capacitance in response to conduction of said valve to render said valve nonconductive for a predetermined number of succeeding half cycles of said voltage, means establishing a discharge circuit for said capacitance to determine the number of half cycles that said valve is nonconductive, and means responsive to conduction of said one of said valves for rendering the second of said valves nonconductive every half cycle of voltage of said source that said one valve is conductive.

4. An alternating current supply circuit, a pair of electric valves connected in parallel and energized from said alternating current supply circuit, said valves each being poled the same way with respect to said alternating current circuit and each having a control member, means for energizing the control member of one of said valves to render said valve conductive for predetermined half cycles of said alternating current supply voltage, means responsive to conduction of said one of said valves for energizing the control member of the other of said valves to maintain the other of said valves nonconductive during the half cycles that said first mentioned valve is conductive, and means for rendering said second valve conductive the positive half cycles that said first valve is nonconductive.

LOUIS G. LEVOY, Jr.